INVENTOR.
LLOYD R. OSTER
BY
Ralph G. Hohenfeldt
ATTORNEY

United States Patent Office 3,363,101
Patented Jan. 9, 1968

3,363,101
X-RAY THICKNESS GAGE COMPRISING MEANS FOR PREVENTING AMPLIFIER SATURATION
Lloyd R. Oster, Erie, Pa., assignor to General Electric Company, a corporation of New York
Filed May 6, 1965, Ser. No. 453,786
1 Claim. (Cl. 250—83.3)

ABSTRACT OF THE DISCLOSURE

In an X-ray plate thickness gage large and instantaneous changes in thickness result in large A-C detector signal changes which tend to exceed the dynamic range of the ensuing amplifier if the D-C level of the signal is high. By way of the invention, only A-C signal changes are amplified by virtue of a synchronous switch grounding one side of a coupling capacitor to equalize the D-C voltage after each X-ray pulse. The synchronous switch uses a center-tapped transformer and a pair of diodes that are alternately forward and reverse biased to make a path to the capacitor alternately nonconductive and conductive.

---

The present invention relates generally to instruments for continuously measuring a characteristic of a material and is particularly useful in a gage for measuring the thickness of metal plate with X-rays in connection with which the invention will be described. X-ray gages are used to measure and control the thickness of hot plate that is being rolled to a desired thickness in a steel mill, for example.

A persistent problem with gages that have been used heretofore, is the slowness with which the thickness indicating meter or recorder follows a sudden and large change in thickness of the material being gaged. Stated in another way, there is a long time constant before a true thickness reading is afforded if there has been a pronounced change in thickness of the plate or if the plate is inserted in or removed from the gage. An underlying cause of this problem is that a large change in thickness is accompanied by the X-ray detectors producing large deviation signals which saturate the amplifier and other electronic components. Then sufficient time must elapse for the signals to fall back within the dynamic range of the amplifier. Usually this involves a signal coupling capacitor from which the large signal must be discharged through a resistor over some finite time until it reaches a voltage to which a new signal may be added without exceeding the dynamic range.

An object of the present invention is to overcome these disadvantages by providing a means for equalizing the voltage on the coupling capacitor whereby to establish the capacitor at a definite D-C voltage level after each X-ray pulse so that incoming pulse signals corresponding with instantaneous thickness changes may be detected.

Another object is to overcome the problems that are incidental to use of D-C amplifiers in gages of this kind by separating the A-C signal component from the D-C and amplifying and detecting only the former to thereby minimize drift, distortion, and the time constant of the system.

How the foregoing and other more specific objects are achieved will appear from time to time throughout the course of the ensuing description of the invention which will be set forth in conjunction with the drawing in which.

Figure 1:
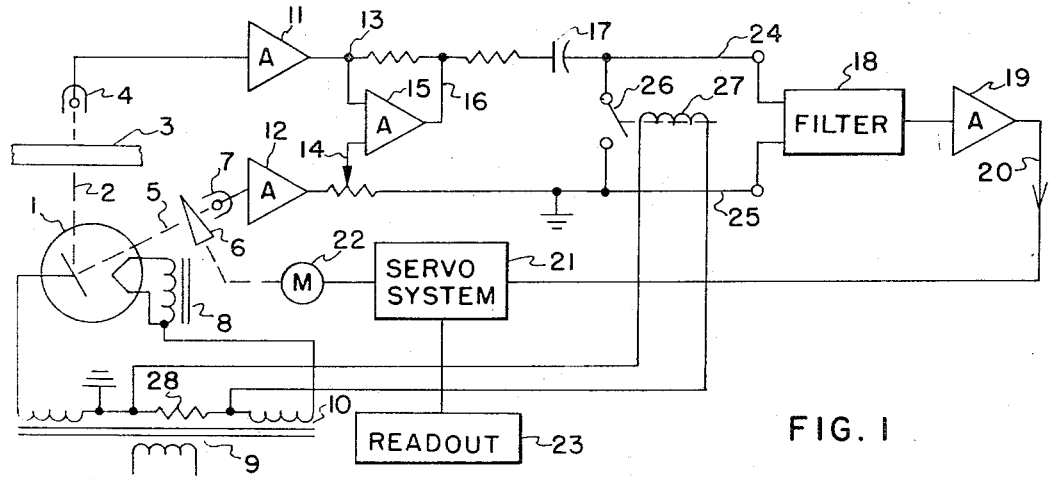
FIGURE 1 is an elementary schematic diagram of an X-ray thickness gage in which the invention is employed.

An X-ray thickness gage in which the invention may be employed is shown in FIGURE 1. This gage measures thickness by comparing the amount of X-ray absorbed in a known reference sample with the amount absorbed by an unknown sample. When the absorptions match, there is no difference, and hence, no deviation signal is produced. When they do not match, there is a deviation signal which represents a thickness change from the setting of the gage.

In FIGURE 1 there is an X-ray tube 1 that projects one beam 2 through an unknown sample of metal plate 3. The intensity of radiation penetrating plate 3 is measured by an X-ray detector which is preferably an ionization chamber 4. Another X-ray beam 5 is projected through a wedge-shaped reference sample 6. The intensity of the radiation penetrating reference sample 6 is detected by an iron chamber 7.

X-ray tube 1 is schematically shown as being connected and supplied with power for operating in the self-rectifying mode. Thus, there is the usual filament transformer 8 and a high voltage transformer 9. Opposite ends of the secondary winding 10 of the high voltage transformer are respectively connected to the cathode and anode of the X-ray tube and as is well-known, if sixty cycle power is applied, there will be sixty X-ray pulses per second. Thus, ionization chambers 4 and 7 detect a series of X-ray pulses that vary in magnitude with variations in the thickness of sample 3. These pulses are supplied to respective preamplifiers 11 and 12. The ion chambers and preamplifiers are connected in such a way that the output pulses from one preamplifier have a polarity that is opposite of the other. It is assumed that preamplifiers 11 and 12 are direct coupled. That is, they have no capacitors or storage devices except perhaps an insignificant amount of inherent stray capacitance. Otherwise the invention which is to be described below would be applied near these preamplifiers.

The pulses are supplied to the input terminals 13 and 14 of a direct coupled differential amplifier 15. The output appearing on conductor 16 from the differential amplifier represents the difference between the magnitudes of the opposite pulses and this signal will have a polarity depending on whether sample 3 is thicker or thinner than is the wedge 6 where it is penetrated by radiation. The difference signal from amplifier 15 is impressed on a coupling capacitor 17 which transmits the alternating part of the signal to a filter 18 from which it goes to an amplifier 19. The amplified difference or deviation signal appears on conductor 20 and this is fed back in a closed loop to a servo system which is symbolized by the block 21 and has affiliated with it a motor 22 that advance and retracts reference wedge 6 so as to vary its X-ray absorption. Initially, a sample 3 of known thickness may be placed in the beam and certain electronic adjustments made so as to position the wedge to null the system in which case zero deviation signal appears on conductor 20. Then if samples 3 of varying thickness are placed in the beam, deviations will occur which result in a signal that actuates servo system 21 and motor 22 to drive the wedge 6 into a position where null is restored. By conventional means, not shown, this mechanical movement of wedge 6 is converted to corresponding electrical signals which constitute the measure of deviation which may be read from a dial, not shown, in a readout device that is symbolized by the block 23.

The description so far has related to a conventional X-ray thickness gage. It will be understood, however, that the general principles here involved may be found in other types of gages and on-line analyzing instruments as well. In other words, the two detector system, or even only one detector, may be used to sense properties such as chemical composition and density of gases, liquids, or solids. It will be understood that the new features of the design which are now to be described, may be employed in such systems as well.

Before departing from FIGURE 1, it should be observed that the alternating differential output signals or pulses appear across conductors 24 and 25 and that these have a switch 26 shunted across them. Switch 26 may be controlled by an electromagnetic vibrator coil 27 which is supplied with a voltage developed across a resistor 28 that is near the center point of the secondary winding 10 on X-ray transformer 9 and is essentially at ground potential. When the current pulses that cause the X-ray pulses flow through secondary winding 10 and resistor 28, a corresponding pulsating voltage is applied to coil 27. The phasing is such that switch 26 is caused to open and close in inverse synchronism with the pulses that appear consecutively on coupling capacitor 17. The use of resistor 28 is only illustrative of a means for producing a synchronous voltage. A low voltage secondary winding on the transformer would also serve the purpose. The output signal from resistor 28 may also be amplified before applying it to the synchronously operated switch.

Figure 2:
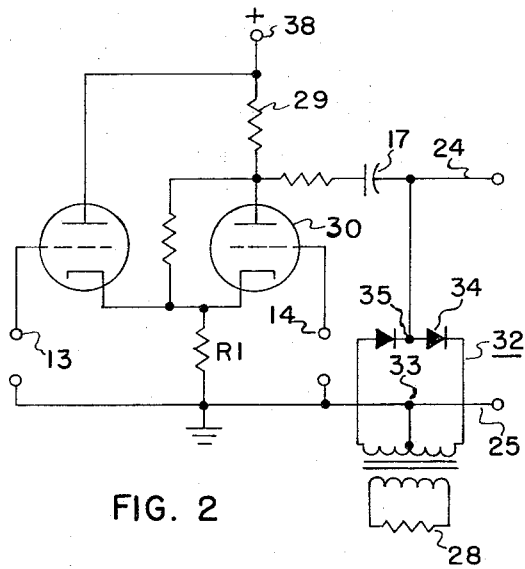
FIGURE 2 is a diagram of a typical amplifier for use in continuous measuring instruments.
Figure 3D:
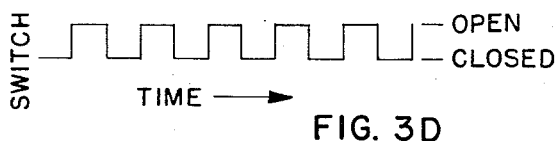

Refer now to FIGURE 2 which shows a differential amplifier with a single-sided output. A number of different differential amplifier circuits of either the solid-state or vacuum tube type could be shown, but this one serves the purpose of facilitating a discussion of the problem of system saturation and the solution of the instant invention. As indicated earlier, saturation and a correspondingly long interval before a stable readout condition is reached may occur when there are pronounced changes in the thickness of sample 3 or when sample is withdrawn or returned to the X-ray beam.

The respective opposite signals from the preamplifiers 11 and 12 may be introduced to the differential amplifier 15 by way of terminals 13 and 14. There is the customary high voltage supply terminal 38 and a plate resistor 29. When the input signals are within the dynamic range of the amplifier, difference signal pulses appearing on the plate of vacuum tube 30 are coupled to the output line 24 through the coupling capacitor 17. The vacuum tube cathodes are also biased positively with respect to the grids by reason of biasing current flowing through resistor R1 to develop the required voltage. In this amplifier, as in similar amplifiers, when a pulse is applied that drives the grids toward a more positive potential, plate resistor 29 conducts a larger current and simultaneously drives the plate of the vacuum tube 30 toward a more negative potential, and coincidentally, the left plate of capacitor 17 becomes more negative or less positive to thereby effect a current pulse on conductor 24. Now if sample plate 3 is suddenly withdrawn from the X-ray beam, the grid signals on the tube in FIGURE 2 become extremely positive and the plate becomes very negative. The plate voltage waveform may even be clipped due to grid conduction. One or more of these large pulses will make the left side of capacitor 17 much less positive than the supply voltage from terminal 38. If sample plate 3 is suddenly returned to the X-ray beam, the pulses will not tend to saturate the amplifier because they will be of a small magnitude that corresponds with the thickness deviation from its reference value for which the gage was preset. These variations may be on the order of a few thousandths of an inch as compared with a plate thickness of two inches of steel. Note in FIGURE 2 that the differential amplifier is direct coupled and without storage devices. This means that the output signal of the differential amplifier has D-C and A-C components that are related to D-C and A-C components of the input signal. Direct coupling is necessary to avoid time constants in the system but it also causes the problem which the invention solves.

As is well-known, with the amplifier used in prior gages, it was necessary for the capacitor 17 to discharge through a resistor to a level that was in the dynamic range of the amplifier in order for small signals to be coupled through the capacitor. This meant that the gage did not read accurately for some time after a large change in plate thickness occurred.

Referring back to FIGURE 1, it will be seen that in accordance with the invention, switch 26 is provided to alleviate these conditions. This switch is adapted to function in such a way as to open when a pulse signal is being coupled through capacitor 17 and to close synchronously when the signal has passed. When the switch closes, capacitor 17 is charged from ground so as to develop a voltage across it which corresponds in magnitude with the last pulse. Thus, if a series of small pulses follow a saturating pulse, the ensuing pulses will be coupled through the capacitor because it will be charged to equal and opposite polarities on its opposite sides.

As a consequence of the switching operation described in the preceding paragraph, the alternating pulse signal is essentially stripped from the D-C component thereof and then amplified. This eliminates the need for being concerned about lack of stability in the system that would result from fluctuating D-C voltage levels.

In FIGURE 2 a diode switch or demodulator 32 substitutes for switch 26 in FIGURE 1. This electronic switch comprises a transformer the primary of which receives voltage pulses corresponding with the X-ray pulses from resistor 28 which is in the secondary 10 of the X-ray transformer. The mid-point 33 in the secondary of the transformer is connected to line 25 which is grounded and constitutes one side of the output from the differential amplifier. The secondary circuit includes two-series connected diodes 34 which are connected at an intermediate point 35 with a conductor that runs to signal voltage output line 24 and capacitor 17. When a pulse is present, a voltage is induced in the secondary of the transformer and this biases the diodes 34 in the forward direction. Because point 35, between the diodes and point 33 on the secondary are at the mid-points and at equal potentials, no current flows from the secondary to the right plate of capacitor 17. When the pulse of current through the X-ray tube disappears, diodes 34 are no longer forward biased in which case current flows between the right plate of capacitor 17 and ground through a path including one diode 34 or the other, depending on polarity, and then through one or the other halves of the transformer secondary and to point 33. Thus, a potential is developed across both plates of capacitor 17 that corresponds with the direct current level of the previous pulse. Note that the impedance through either switch 26 or diode switch 32 is practically zero so the capacitor voltage is equalized nearly instantaneously. Hence, there is no time constant to contend with and it does not make any difference how much change there is between consecutive pulses.

Figure 3A:
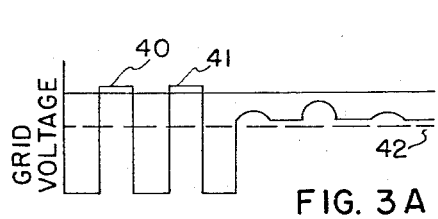
FIGURES 3A–3D are related graphs for facilitating explanation of the invention.
Figure 3B:
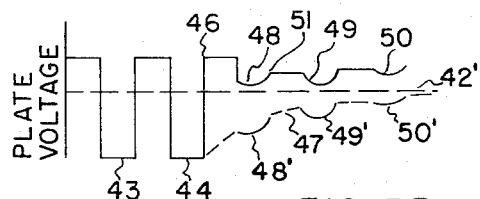
Figure 3C:
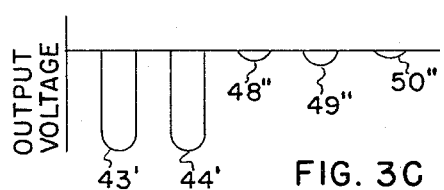

The sequence of events may be better understood by referring to FIGURES 3A–3D. In FIGURE 3A, the input signal or grid voltage waveform is plotted. In this figure, as in the others, the downward direction represents a more negative voltage and upward a more positive. Assuming that the plate 3 is removed from the X-ray beam, it may be seen that the grid voltage or input signal increases positively and develops pulse waveforms 40 and 41 corresponding with this condition. It may be noted that the grid voltage is well above the cut-off level 42 of the vacuum tube and that pulses 40 and 41 may even be clipped due to grid current flow that accompanies overdriving the amplifiers. Ideally, and as a result of the present invention, the small pulses that follow large pulses 40 and 41 in FIGURE 3A would be above grid cut-off level 42 and yet be within the dynamic range of the amplifier. As explained above, at such a time as the grid voltage is very positive, the plate voltage becomes less positive or tends toward negative, as shown by the negative pulses 43 and 44 in FIGURE 3B. The output pulses appearing across lines 24 and 25 would be negative and large as indicated by the negative waveforms 43″ and 44″ in FIGURE 3C. If the plate 3 were now suddenly restored to the X-ray beam at a time corresponding with point 46 in FIGURE 3B, but for the invention capacitor 17 would discharge along the usual exponential curve represented by broken line 47 and it can be seen that subsequent small pulses 48', 49', and 50', for example, would not be transferred through the capacitor 17. It would be necessary for the capacitor to reach a sufficiently positive level, that is, go above broken line 42' before the small pulses could be detected.

If after each pulse such as at point 46 in this example, the right side of capacitor 17 is connected to ground, an equalizing voltage will appear across capacitor 17 so that the next pulse 48, for instance, will be conducted. When pulse 48 disappears, diode switch 32 again conducts at a point such as 51 to again balance the voltage across capacitor 17 so it sees the next pulse 49, and so on. In this way, the time constant of the system is made essentially zero and every output pulse is detected as demonstrated by FIGURE 3C wherein corresponding pulses have double primed numerals.

To further explain operation with numerical values, we may take as an example an instant when the voltage at terminal 28 is 300 volts positive and capacitor 17 has 100 volts on its left side, that is, the plate has 100 volts with a large pulse present. Now assume that the grid voltage pulses are reduced in size such as when the plate is removed from the beam. At point 46 in FIGURE 3B or immediately after any plate voltage change and when no pulse is present, the switch closes and connects the right side of capacitor 17 to ground. Assume now that the smaller incoming pulse produces a less negative plate voltage, say 250 volts positive on the left side of capacitor 17. Now there are 250 volts on the left side and still 100 volts on the right side with respect to the cathode. When the pulse interval ends and the pulse disappears, the plate is just idling with 250 volts on it and after disappearance, the switch effectively closes. Closure changes the capacitor 17 to the new 250 volt level so that the output voltage can change in this manner with every pulse if need be. This is done instantaneously upon closure or conduction of the switch without any time constant or discharge time being required. Accordingly, essentially instantaneous changes in the deviation signal follow sudden changes in plate thickness.

Although the invention has been described primarily in connection with an X-ray thickness gage and although the description has involved use of particular electronic components, those versed in the art will appreciate that the invention may be variously embodied and utilized. Accordingly, the description is to be considered illustrative and unlimited in scope except as required by the claim which follows:

What is claimed:
1. An X-ray gage for measuring the thickness of a material, comprising:
 (a) an X-ray tube,
 (b) a source of alternating voltage connected across the electrodes of the X-ray tube to produce X-ray pulses,
 (c) a pair of X-ray detectors one of which detects the intensity of pulsed radiation that penetrates the material being measured and the other of which detects radiation of a reference beam,
 (d) a direct coupled differential amplifier means connected to receive electric signals having A-C and D-C components from the detectors and producing output signal pulses that are proportional to the difference between the first named signal pulses and that have A-C and D-C components,
 (e) a capacitor connected with the output of the amplifier and on one side of said capacitor appears the pulse signals and a direct signal component,
 (f) means coupled with the alternating voltage source for the X-ray tube to produce control signals that are synchronous with the conduction intervals of the X-ray tube,
 (g) an electric switch means in a low impedance path to the other side of the capacitor and operated by said control signals to a conductive state between pulse signals to thereby discharge or charge the capacitor between successive signals,
 (h) said electric switch means including a transformer, the primary of which receives the synchronous control signals,
 (i) at least a pair of diodes connected unidirectionally in series across the transformer secondary and with a point intermediate the diodes connected to said other side of the capacitor,
 (j) the mid-point of said secondary being connected to a point of different potential with respect to the said other side of the capacitor.

References Cited
UNITED STATES PATENTS

| | | | |
|---|---|---|---|
| 2,669,662 | 2/1954 | Lundahl et al. | 250—102 X |
| 2,916,702 | 12/1959 | Bigelow | 330—9 X |
| 3,056,026 | 9/1962 | Bigelow | 250—83.3 |
| 3,139,590 | 6/1964 | Brown | 330—51 X |
| 3,237,116 | 2/1966 | Skinner et al. | 330—9 |

ARCHIE R. BORCHELT, *Primary Examiner.*